United States Patent [19]

Borrman et al.

[11] Patent Number: 4,499,047
[45] Date of Patent: Feb. 12, 1985

[54] FUEL ASSEMBLY WITH A TOP PLATE ARRANGED ABOVE THE UPPER END SURFACES OF THE FUEL RODS

[75] Inventors: Bo Borrman; Bengt Ode, both of Vësterås, Sweden

[73] Assignee: AB Asea-Atom, Vësterås, Sweden

[21] Appl. No.: 315,605

[22] Filed: Oct. 30, 1981

[30] Foreign Application Priority Data

Dec. 19, 1980 [SE] Sweden ............................. 80089873

[51] Int. Cl.³ ................................................ G21C 9/00
[52] U.S. Cl. ..................... 376/434; 376/364; 376/438; 376/440
[58] Field of Search ............... 376/434, 438, 440, 445, 376/448, 443, 444, 364

[56] References Cited

U.S. PATENT DOCUMENTS

| | | | |
|---|---|---|---|
| 3,163,584 | 12/1964 | Roche et al. | 376/440 |
| 3,356,587 | 12/1967 | Heck, Jr. | 376/445 |
| 3,475,273 | 10/1969 | Krawiec | 376/445 |
| 3,713,974 | 1/1973 | Previti et al. | 376/445 |
| 3,801,453 | 4/1974 | Jone | 376/440 |
| 3,913,689 | 10/1975 | Andersson et al. | 376/444 |
| 4,030,975 | 6/1977 | Anthony et al. | 376/445 |

FOREIGN PATENT DOCUMENTS

| | | |
|---|---|---|
| 642316 | 1/1964 | Belgium . |
| 036142 | 3/1981 | European Pat. Off. . |
| 1439426 | 3/1969 | Fed. Rep. of Germany . |
| 1514489 | 6/1970 | Fed. Rep. of Germany ...... 376/440 |
| 1544351 | 10/1968 | France . |
| 2171279 | 2/1973 | France . |
| 2296919 | 12/1975 | France . |
| 1195670 | 6/1970 | United Kingdom . |
| 2054247A | 2/1981 | United Kingdom . |

Primary Examiner—Sal Cangialosi
Attorney, Agent, or Firm—Pollock, Vande Sande & Priddy

[57] ABSTRACT

A fuel assembly for a boiling water reactor comprises a plurality of vertical fuel rods (1) and is furnished with a fuel channel device. The fuel rods are arranged with their lower ends resting on a bottom plate and positioned by means of a plurality of spacers (6) attached to the casing. The freedom of movement of the fuel rods in the upward direction is limited by means of a top plate (12) arranged above the upper end surfaces of the fuel rods (1).

6 Claims, 4 Drawing Figures

FUEL ASSEMBLY WITH A TOP PLATE ARRANGED ABOVE THE UPPER END SURFACES OF THE FUEL RODS

TECHNICAL FIELD

The present invention relates to a fuel assembly which is arranged in a water reactor and comprises a fuel channel device, a plurality of vertical fuel rods, a plurality of spacers, a top plate and at least one bottom plate, the fuel rods being positioned in said fuel channel device by means of said bottom plate(s) and said spacers. More particularly, the invention relates to a fuel assembly in which the top plate is arranged in a manner which permits relatively great tolerances in the manufacture of the top plate.

According to a further development of the invention, the assembly is provided with a top plate of the above-mentioned kind which is designed to contribute as little as possible to the hydraulic resistance of the fuel assembly.

BACKGROUND ART

In conventional fuel assemblies of the kind referred to, the upper ends of the fuel rods are inserted in corresponding holes in a top plate, for example as disclosed in the U.S. patent specification No. 3,697,375, whereby some of the rods have threaded end portions, furnished with nuts above the top plate.

DISCLOSURE OF INVENTION

According to the invention, in a boiling water reactor of the kind referred to, said spacers are arranged with a limited freedom of movement in an axially upward direction in relation to said fuel channel device whereas said top plate is arranged in its entirety above said fuel rods and constructed in such a way that each fuel rod, upon a sufficiently great movement in an axially upward direction, is prevented from further movement in said direction by mechanical contact with said top plate.

BRIEF DESCRIPTION OF DRAWINGS

In the following the invention will be described with reference to the accompanying drawings, in which.

DESCRIPTION OF A PREFERRED EMBODIMENT

Figure 1:
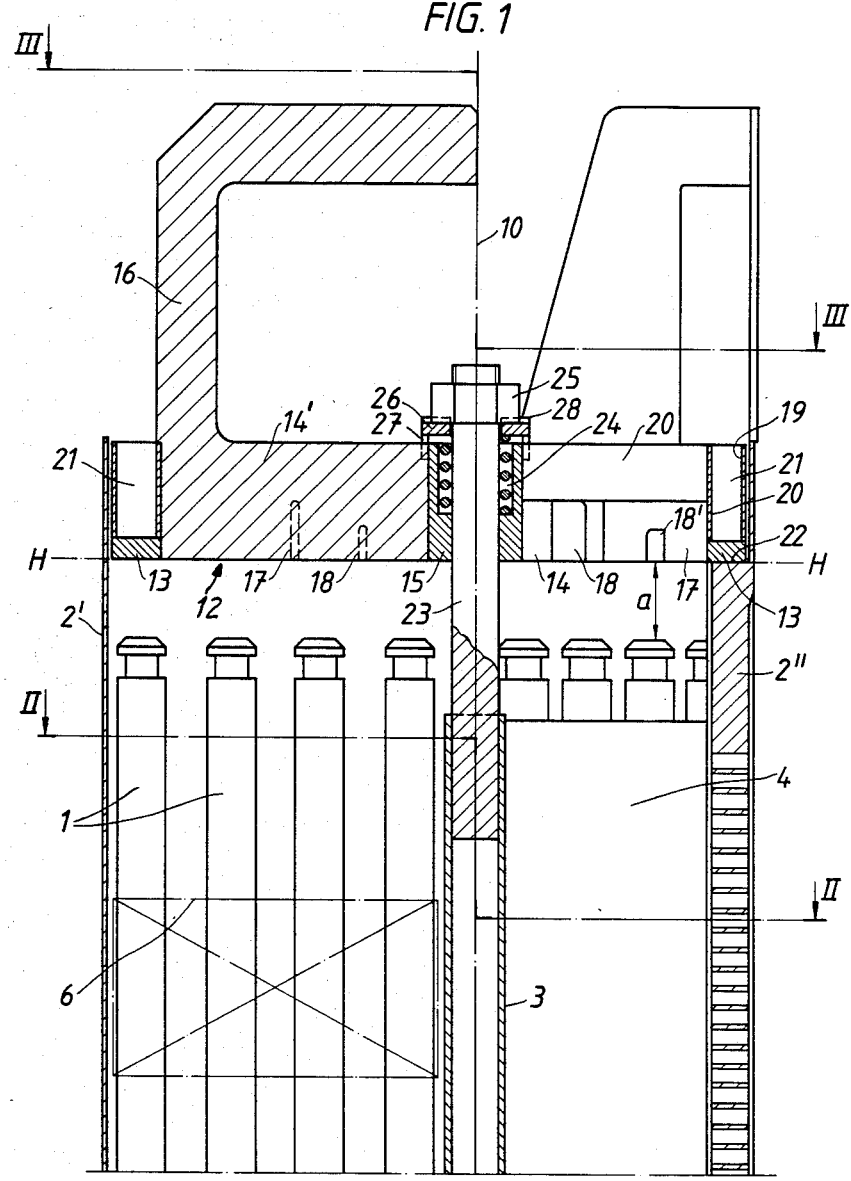
FIG. 1 shows a fuel assembly according to the invention in a vertical section along I—I of FIGS. 2 and 3, which show horizontal sections along II—II and III—III, respectively, of FIG. 1.
Figure 2:
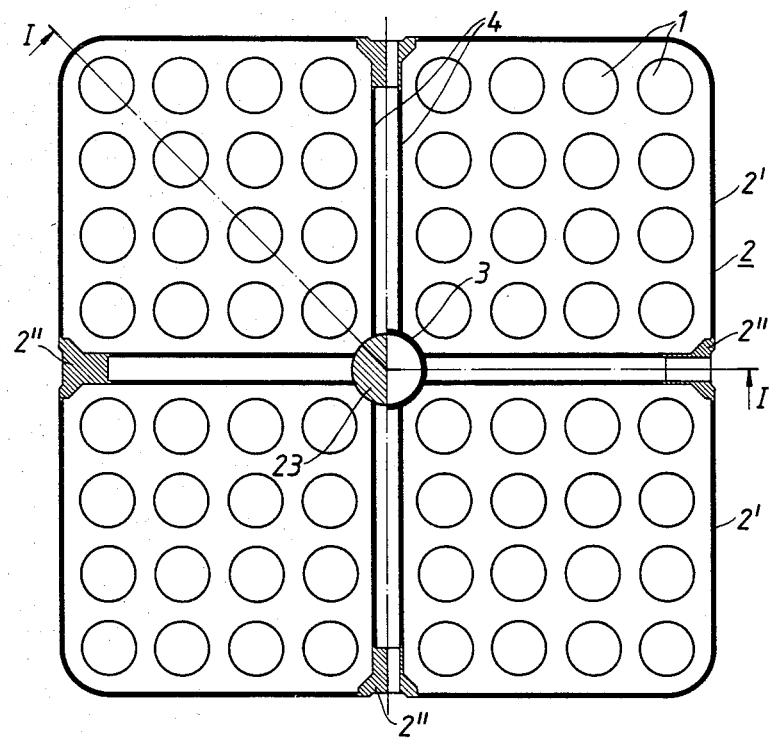
Figure 3:
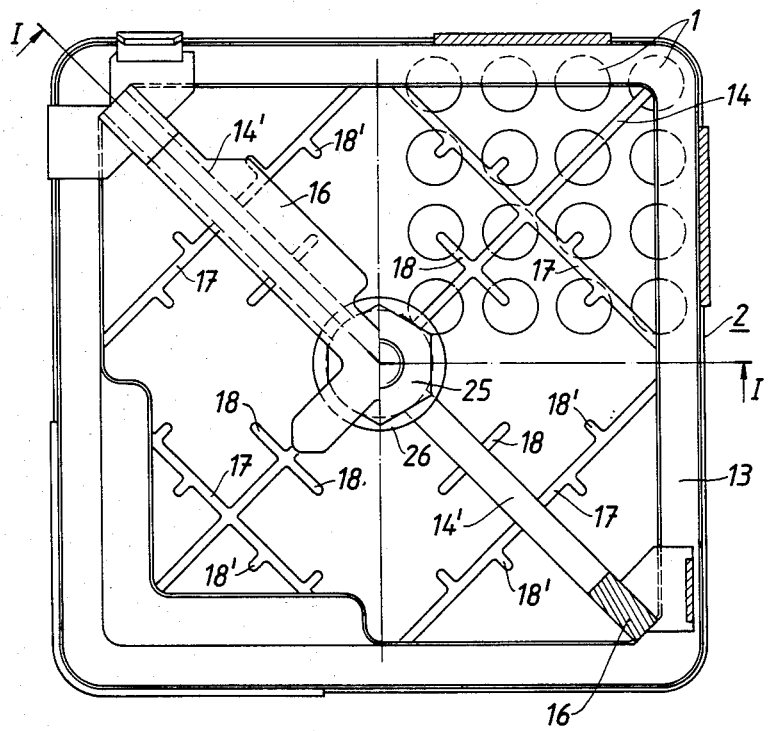
Figure 4:
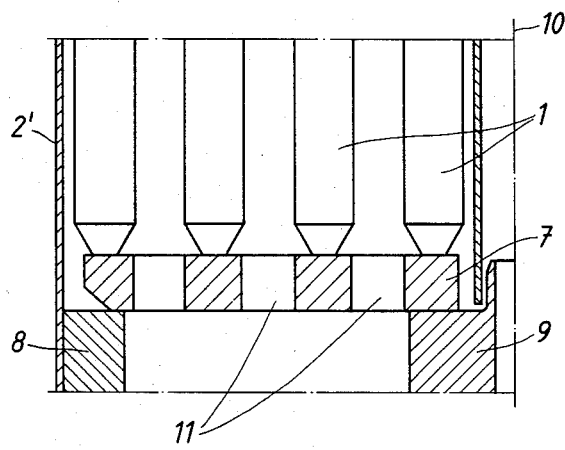
FIG. 4 shows a bottom plate of the same fuel assembly in partial section along I—I of FIGS. 2 and 3.

The fuel assembly shown in the drawings has sixty-four fuel rods 1, which are vertically arranged and surrounded by a fuel channel 2 of substantially quadratic cross-section. The fuel channel 2 is welded-together by four elongated, vertically arranged sheet-metal elements 2' of L-shaped cross-section, said sheet-metal elements 2' being interconnected by means of four vertical supporting strips 2". The space surrounded by the fuel channel 2 is divided along the active portion of the fuel rods into four equally large parts by means of four double partition walls, each of which is arranged between a supporting strip 2" and a central water tube 3. Each partition is composed of two parallel wall elements 4. Thus, the fuel assembly is divided into four partial assemblies with sixteen fuel rods in each partial assembly, each partial assembly being provided with a plurality of spacers, each of which is made for sixteen fuel rods 1 and arranged with greatly reduced axial freedom of movement in relation to adjacent fuel channel portions, for example with the aid of a plurality of inwardly-directed blocking projections, which are formed in the surrounding walls and disposed in such a manner that the freedom of movement in a vertically upward direction, at room temperature, is less than 5% of the length of the fuel rod, preferably less than 1% of the length of the rod. A spacer of this kind is indicated in FIG. 1 by means of a rectangle 6 with a diagonal. In each partial assembly the fuel rods 1 rest by their lower ends on a corresponding bottom plate 7, which together with the bottom plates of the other partial assemblies is supported by a base 8 and a central member 9 arranged therein. The vertical centre axis of the fuel assembly is designated 10. The spacers can, for example, be made as those described in the U.S. Pat. No. 4,190,494.

Each bottom plate 7 is provided with nine through-holes 11 for a water flow supplied to the partial assembly. The fuel channel 2 has a substantially quadratic portion, located above the wall elements 4, in which portion a top plate 12 common to all the fuel rods is arranged above the upper end surfaces of the fuel rods 1. All the surfaces of the top plate 12 facing the fuel rods lie in a horizontal plane H—H, the vertical distance of which to the fuel rods is designated a in FIG. 1. The distance a is related to room temperature. During normal reactor operation the corresponding distance is considerably smaller, but greater than zero. The top plate 12 is made in such a way that each fuel rod 1, upon a sufficiently great movement in the axially upward direction, is prevented from further movement in this direction by mechanical contact with the top plate. The top plate is designed to constitute an efficient blocking device for all the fuel rods and to contribute to a smaller extent than conventionally designed top plates to the hydraulic resistance of the fuel assembly.

The top plate 12 contains a substantially quadratic frame 13, which is arranged to be surrounded by the upper portion of the fuel channel with no mentionable play, the outer sides of the frame being each positioned adjacent a side of the above-mentioned fuel channel portion. In addition, the top plate comprises two horizontal diagonal bars 14, lying on the same line, and two approximately twice as high horizontal diagonal bars 14' positioned perpendicularly to the diagonal bars 14. Each of the diagonal bars 14 and 14' is rigidly fixed to a corresponding corner of the frame 13 by one of their ends, the other end being welded to a central sleeve 15. At their radially outer ends the diagonal bars 14' are mechanically connected to a lifting yoke 16. Each of the diagonal bars 14 and 14' has a middle portion which is rigidly connected to a middle portion of a cross bar 17, and each of the cross bars 17 is rigidly connected to the frame 13 at both ends. Each of the diagonal bars 14, 14' and the cross bars 17 is provided with a plurality of projections 18 and 18', respectively, positioned in the horizontal plane H—H, each of said projections being arranged vertically above one fuel rod 1. The fuel rods which are not located vertically below any projection 18 or 18' are arranged vertically below a portion of the frame 13 or the diagonal bars 14 and 14'.

The frame 13 is substantially made with U-formed cross-section, that is, it is provided with a radially outer, vertical wall 19 and a radially inner vertical wall 20 along a predominant portion of its circumference, a distribution channel 21 for sprinkling water being formed between said walls 19 and 20. Thus, the top plate 12, in addition to its main function, also gives a more even distribution of emergency cooling water if the sprinkling should be uneven.

The top plate 12 is arranged with the frame 13 resting on upwardly-facing supporting surfaces 22 provided at the upper end of each of the four vertical supporting strips 2".

At its upper end the central water tube 3 is welded to the lower end of a coaxially arranged rod 23, which at its upper end is surrounded by the sleeve 15 and by a helical spring 24, which may be compressed to a greater or smaller extent by means of a nut 25 arranged on a threaded end portion of the rod 23, thus achieving a well-defined load on the supporting surfaces 22.

Between the nut 25 and the spring 24 there is arranged a locking washer 26, which is made with a plurality of axially directed projections 27 making contact with at least one of the diagonal bars 14 and 14', by means of which the locking washer 26 is secured against rotation about the axis 10. The upper side of the locking washer is made with a plurality of radially directed teeth 28, which are pressed by means of the spring 24 into engagement with corresponding teeth on the lower side of the nut 25. When tightening and slackening the nut 25, a box spanner is used by means of which the locking washer 26 is pressed downward, so that the engagement of the teeth 28 with the teeth of the nut 25 is released.

When the top plate 12 has been removed, the fuel rods 1 may be withdrawn individually without any further preceding measures.

The fuel assembly described with reference to the drawings is only one of many possible embodiments of a fuel assembly according to the invention. Thus, the top plate may be arranged and constructed in the manner stated in claims 1 and 2 also if the fuel assembly is not divided into a plurality of partial assemblies, or if it is divided into partial assemblies in some other manner, for example as shown in U.K. patent application No. 2,054,247. Instead of resting of the supporting strips 2", the top plate may rest on a supporting surface provided on the rod 23. Instead of being provided with a plurality of bottom plates 7, the fuel assembly may have one single bottom plate supporting all the fuel rods.

We claim:

1. A fuel assembly for a boiling water reactor comprising:
   a plurality of fuel rods having vertical center lines;
   at least one bottom plate supporting said fuel rods;
   a vertical fuel channel of rectangular cross-section;
   partition means dividing said fuel channel into four sub-channels, each sub-channel enclosing a bundle of said fuel rods positioned by means of a plurality of spacer devices to constitute a sub-assembly of fuel rods, said spacer devices having a limited freedom of movement in an axially upward direction in relation to said fuel channel; and,
   means for limited movement of said fuel rods in an axially upward direction, said movement limited means including a top plate positioned a vertical distance above said fuel rods at room temperature, said top plate comprising:
   a central member arranged in detachable mechanical connection with said partition means,
   a frame disposed with four sides adjacent to corresponding sides of said fuel channel,
   four substantially horizontally directed diagonal bars rigidly connected to corresponding corner portions of said frame at one end and to said central member at the other end, and,
   four substantially horizontally directed cross bars arranged to cross said diagonal bars, said diagonal bars having a mid-portion rigidly connected to a mid-portion of a corresponding cross bar and each of said cross bars having a plurality of horizontally directed first elongated projections each projecting laterally from said cross bar in a direction towards the vertical center line of a corresponding fuel rod,
   said frame having a corner portion positioned vertically above a first group of fuel rods belonging to a said sub-assembly, a second group of fuel rods belonging to the same said sub-assembly being positioned vertically below free end portions of said first elongated projections, and said corner portion and each of said first elongated projections being contactable by corresponding fuel rods upon a sufficiently large vertically upwardly-directed movement of said corresponding fuel rods.

2. A fuel assembly according to claim 1 in which a plurality of second elongated projections extend laterally from each of said diagonal bars and are contactable by corresponding fuel rods upon a sufficiently large vertically upwardly-directed movement of said corresponding fuel rods.

3. A fuel assembly according to claim 1 having four sub-channels, four diagonal bars and four cross bars, and in which each of said four cross bars have each end rigidly connected to said frame.

4. A fuel assembly according to claim 1 in which said central member of the top plate comprises a sleeve and said sleeve is arranged to detachably surround an upper end portion of a centrally arranged, elongated force-transmitting member having a tensile force-transmitting connection below said top plate with said partition means, said partition means being rigidly connected to said fuel channel, said force-transmitting member being provided with means for limiting the axial freedom of movement of said sleeve in relation to said force-transmitting member, at least in an upward direction.

5. A fuel assembly according to claim 4 in which each side of said fuel channel is provided with a vertically directed strip, and said sleeve is provided with a spring arranged to press said top plate against horizontal, upwardly facing supporting surfaces provided at the upper ends of said vertically directed strips.

6. A fuel assembly according to claim 4 in which said force-transmitting member is threaded at its upper end and provided with a nut having an uneven contact surface facing an uneven contact surface of an axially movable locking member which is secured against rotational movement about a vertical axis, and in which at least one of said contact surfaces is provided with at least one projection which is held in engagement with a corresponding recess of the other contact surface by the force of a spring means.

* * * * *